United States Patent [19]

Narasimha

[11] 4,237,551
[45] Dec. 2, 1980

[54] TRANSMULTIPLEXER

[75] Inventor: Madihally J. Narasimha, Mountain View, Calif.

[73] Assignee: Granger Associates, Santa Clara, Calif.

[21] Appl. No.: 972,458

[22] Filed: Dec. 22, 1978

[51] Int. Cl.$^3$ .............................................. H04J 4/00
[52] U.S. Cl. .................................... 370/50; 364/724
[58] Field of Search ........ 179/15 FD, 15 FS, 15 BM; 364/724, 725; 370/50, 69

[56] References Cited

U.S. PATENT DOCUMENTS

| | | | |
|---|---|---|---|
| 3,605,019 | 9/1971 | Cutter | 325/65 |
| 3,891,803 | 6/1975 | Daguet | 179/15 FS |
| 3,971,922 | 7/1976 | Bellanger et al. | 179/15 FS |
| 4,013,842 | 3/1977 | Kao et al. | 179/15 FD |
| 4,075,429 | 2/1978 | Takahata et al. | 179/15 FS |
| 4,117,541 | 9/1978 | Ali | 179/15 FD |
| 4,131,766 | 12/1978 | Narasimha | 179/15 FD |

OTHER PUBLICATIONS

"A Generalized Scheme for an All Digital Time Division Multiplex to Frequency Division Multiplex Translator", by Claasen et al., Phillips Research Labs., Eindhoven, The Netherlands.
"System Analysis of a TDM-FDM Translator/Digital A-Type Channel Bank" by Freeny et al., IEEE Trans. on Comm. Tech., vol. COM-19, No. 6, Dec. 1971, pp. 1050-1059.
"Design & Simulation of a Speech Analysis-Synthesis System . . . ", *IEEE Trans. Audioelectroacoustics*, vol. AV-21, pp. 165-174, Jun. 1973, Schafer et al.
"Implementation of the Digital Phase Vocoder Using the FFT", *IEEE Trans. Acoustics, Speech, & Signal Processing*, vol. ASSP-24, pp. 243-248, Jun. 1976, Portnoff.
"A Digital Block Processor . . . ", *IEEE Trans. Communications*, vol. COM-23, pp. 282-286, Feb. 1975, Terrell et al.
"Techniques for Digital Interfacing . . . ", *Proc. IEEE*, vol. 123, pp. 1285-1290, Dec. 1976, Tomlinson et al.
"Digital Filtering by Polyphase Network . . . ", *IEEE Trans. Acoustics, Speech & Sig. Processing*, vol. ASSP-24, pp. 109-114, Apr. 1976, Bellanger et al.
"A Prime Factor FFT Alogrithm . . . ", *IEEE Trans. Acoustics, Speech & Signal Processing*, vol. ASSP-25, pp. 281-294, Aug. 1977, Kolba et al.
"Design of Digital Filters for an All Digital FDM-TDM Translator", *IEEE Trans. Circuit Theory*, vol. CT-18, pp. 702-711, Nov. 1971, Freeney et al.
"An Exploratory Terminal for Translating . . . ", *Proc ICC 71*, pp. 22-31 to 22-36, by Freeny et al.
"On Digital Single-Sideband Modulator", *IEEE Trans. Circuit Theory*, vol. CT-17, pp. 409-414, Aug. 1970, Darlington.
"TDM-FDM Translator . . . ", *IEEE Trans. Communication Tech.*, vol. COM-22, pp. 1199-1204, Sep. 1974, Bellanger et al.

*Primary Examiner*—Douglas W. Olms
*Attorney, Agent, or Firm*—Flehr, Hohbach, Test, Albritton & Herbert

[57] ABSTRACT

A transmultiplexer and method for use in a telephone system for translating information between time division and frequency division multiplexed formats. The transmultiplexer includes discrete cosine transform processor means connected to receive a linearly coded time division multiplexed signal representing a plurality of information channels for transforming the time division signal into a frequency division multiplexed signal and also includes weighting network means for weighting the transformed signal with predetermined real coefficients thereby forming a frequency division multiplexed signal corresponding to said time division multiplexed signal. The weighting network means are connected to receive a second multi-channel frequency division multiplexed signal for weighting the frequency signal with predetermined real coefficients thereby forming a weighted signal. An inverse discrete cosine transform processor transforms the weighted signal into a multi-channel time division multiplexed signal corresponding to the frequency division multiplexed signal.

7 Claims, 15 Drawing Figures

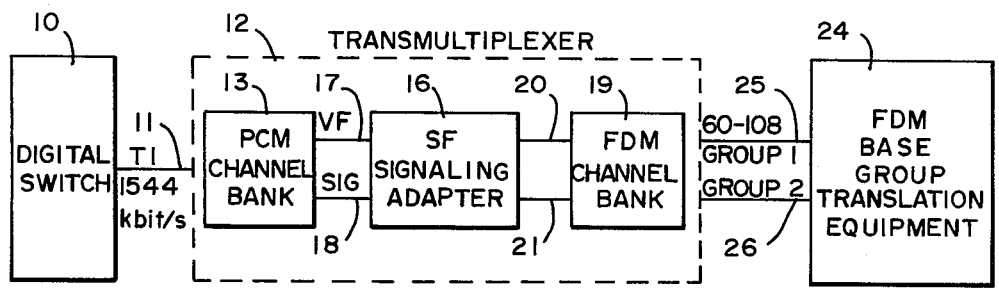
FIG.—1
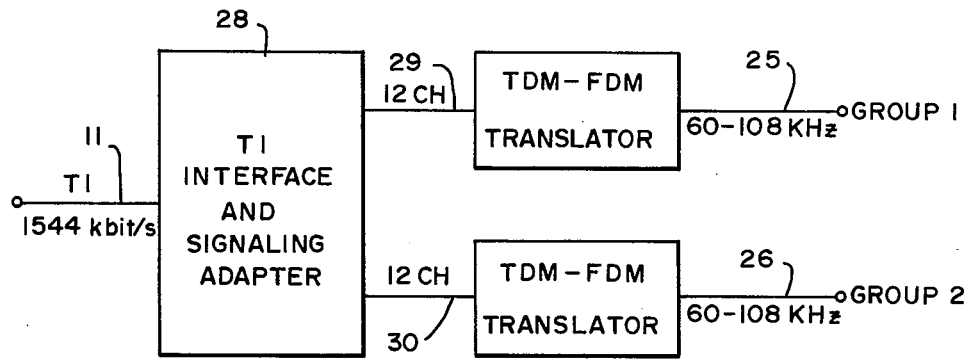
FIG.—2
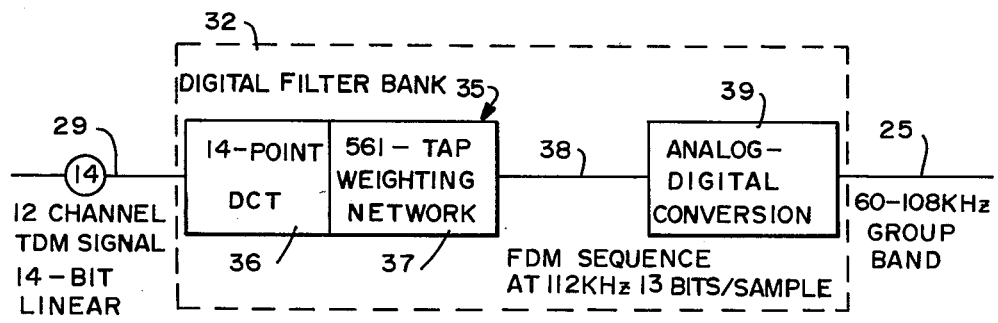
FIG.—3A
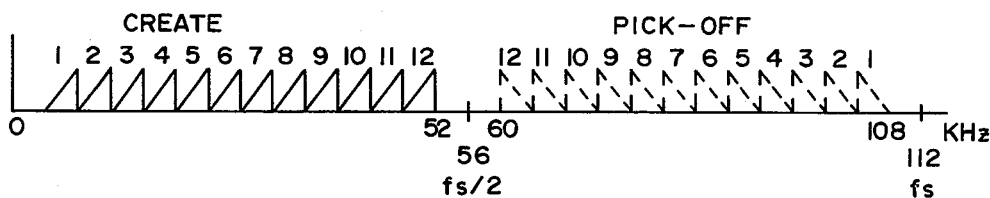
FIG.—3B

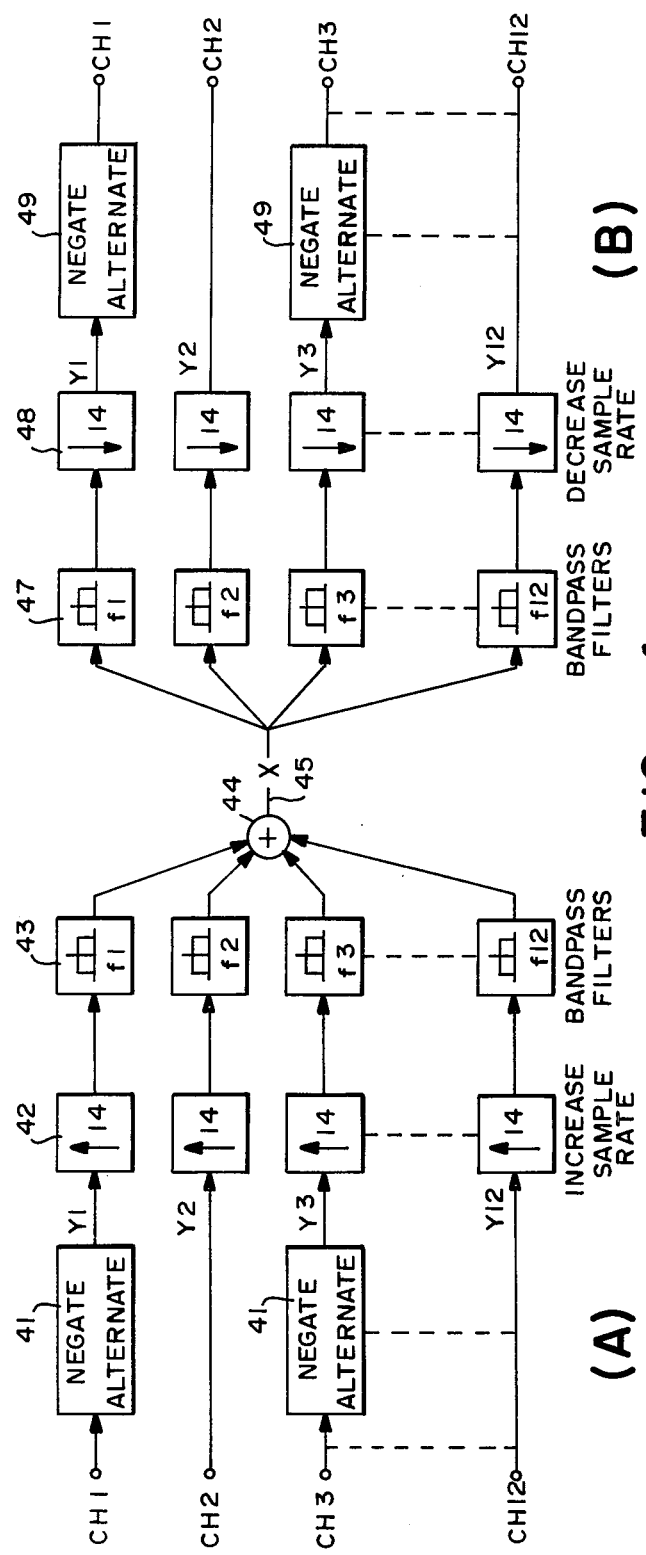
FIG.—4
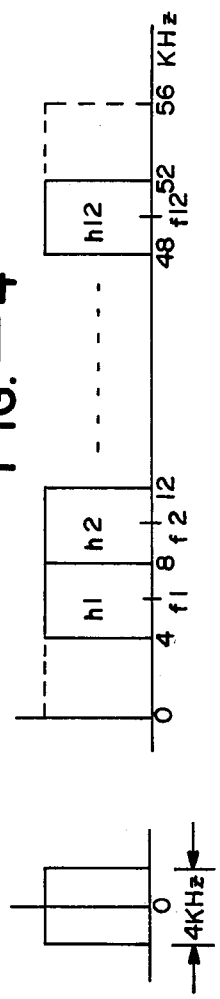
FIG.—5

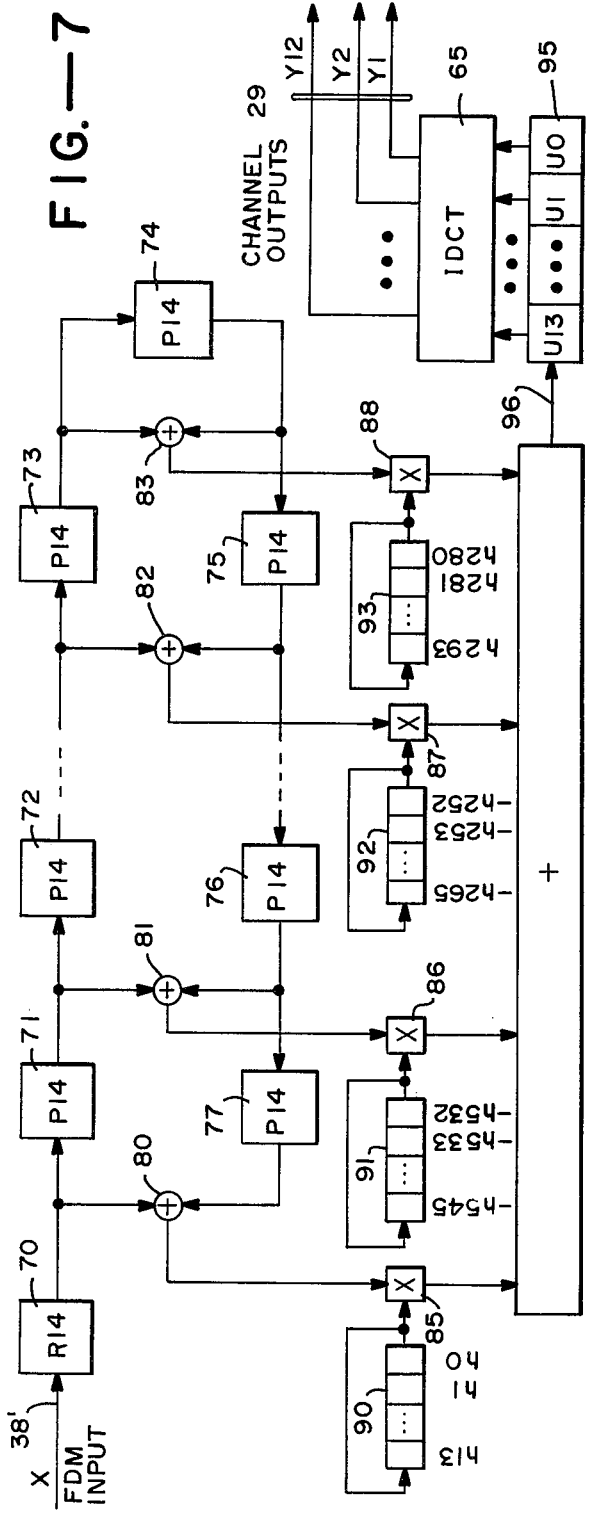
FIG.—7
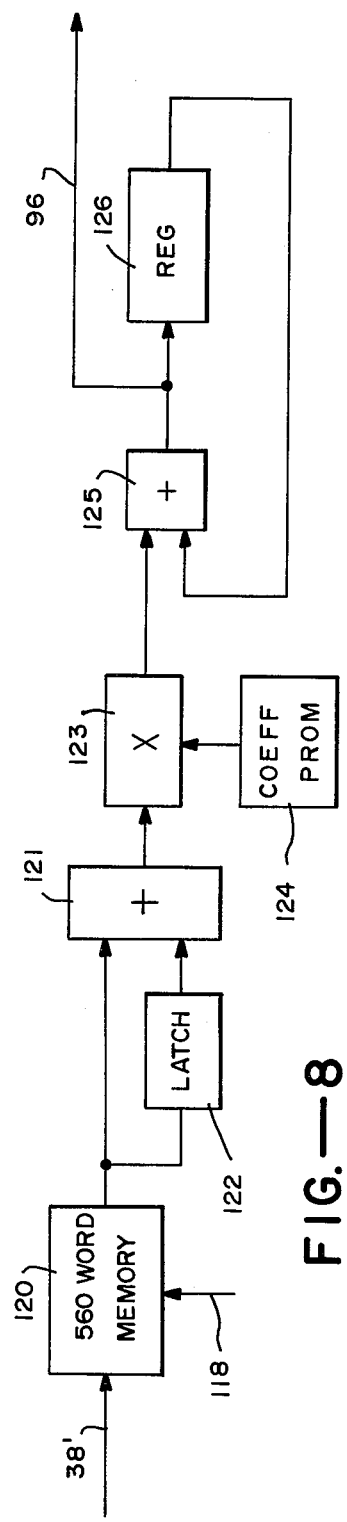
FIG.—8

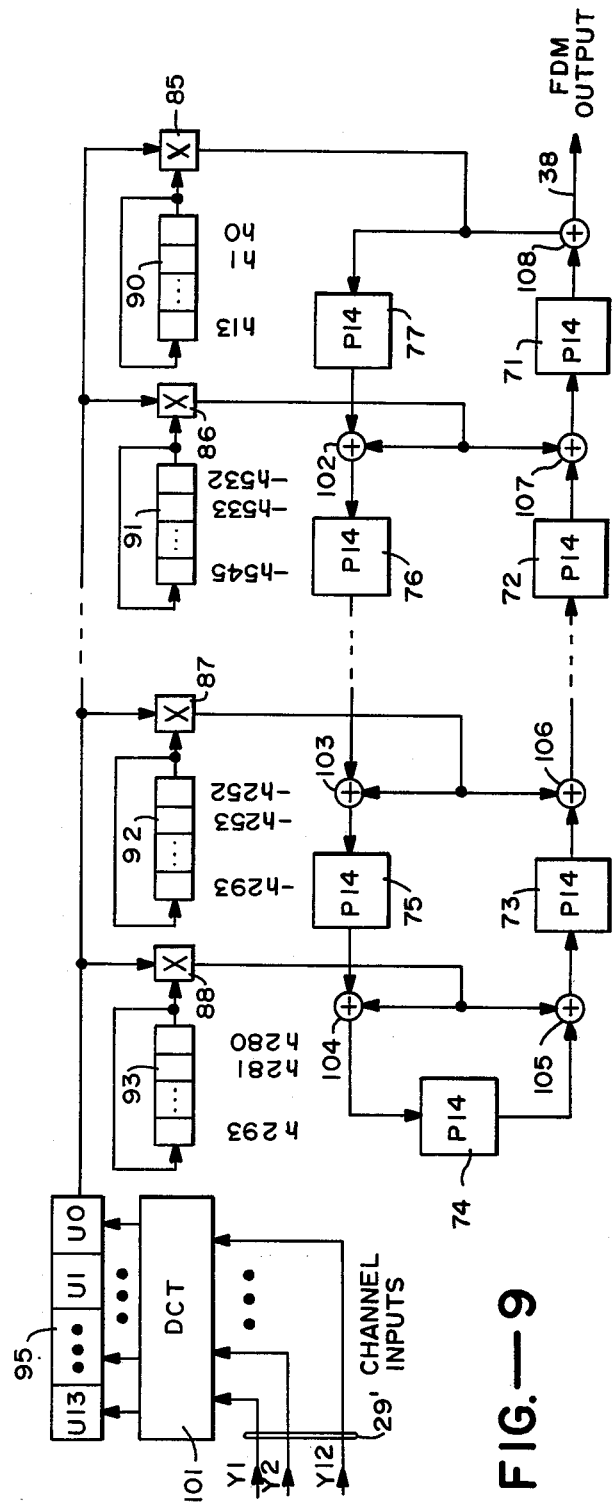
FIG.—9
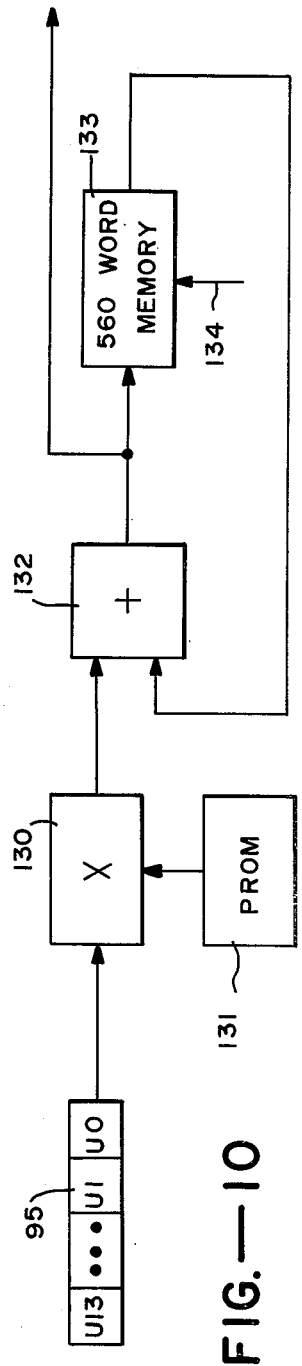
FIG.—10

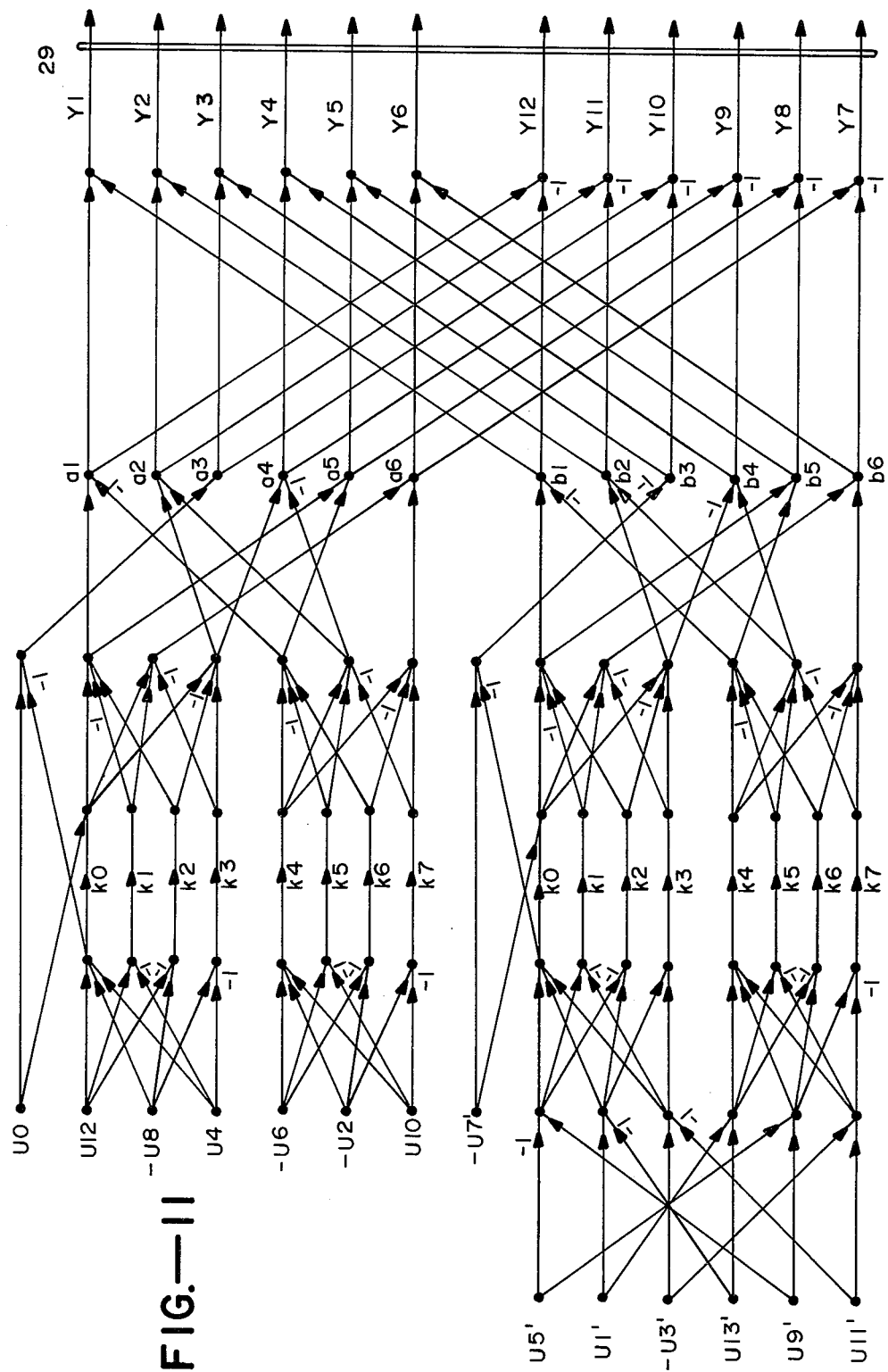
FIG.—11

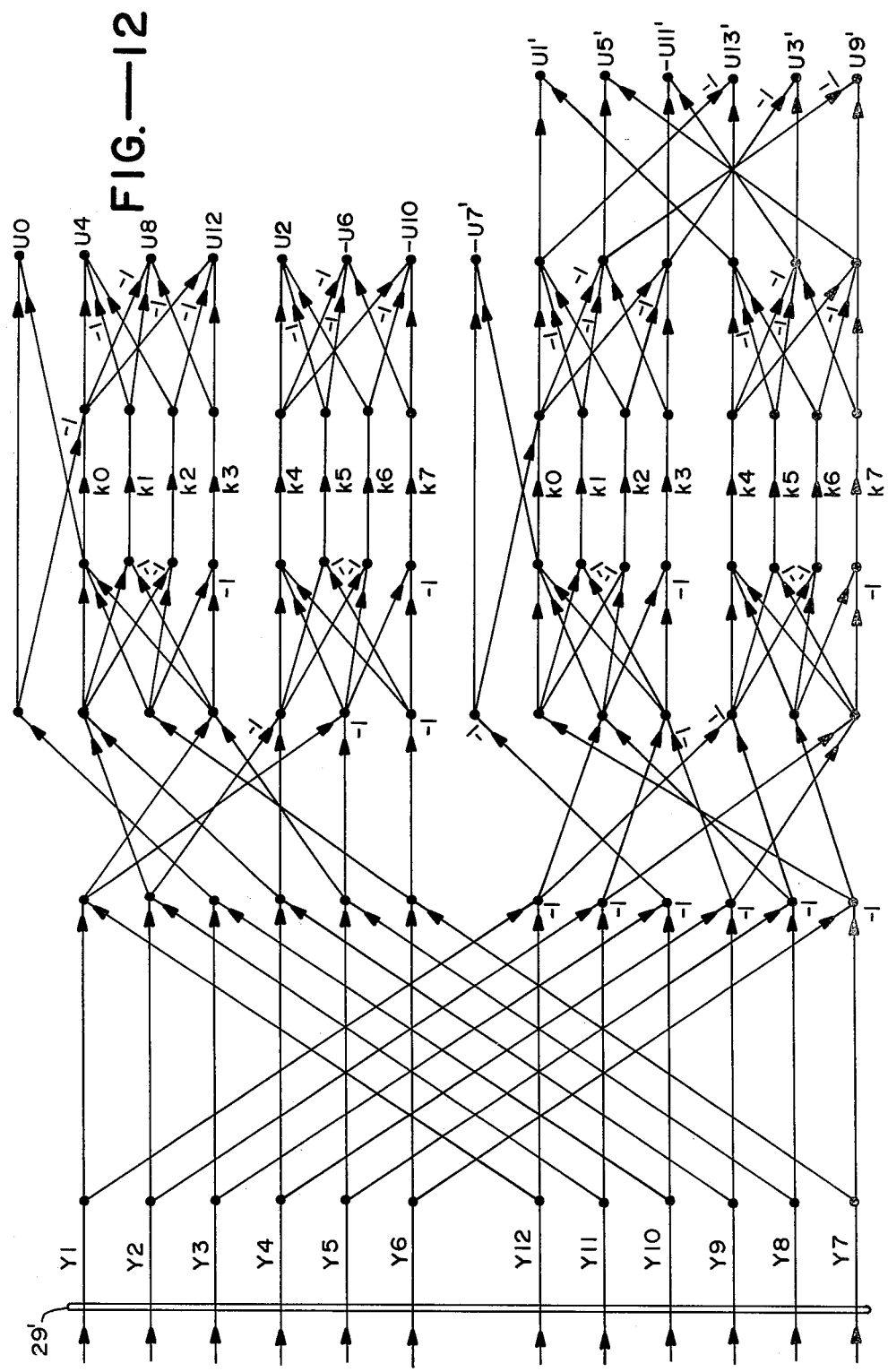

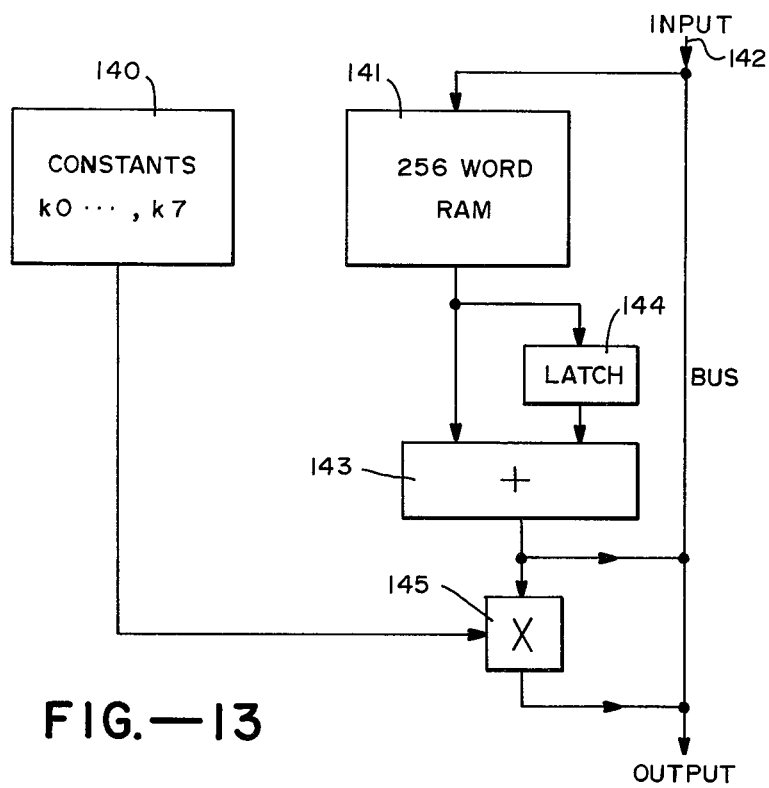
FIG.—13
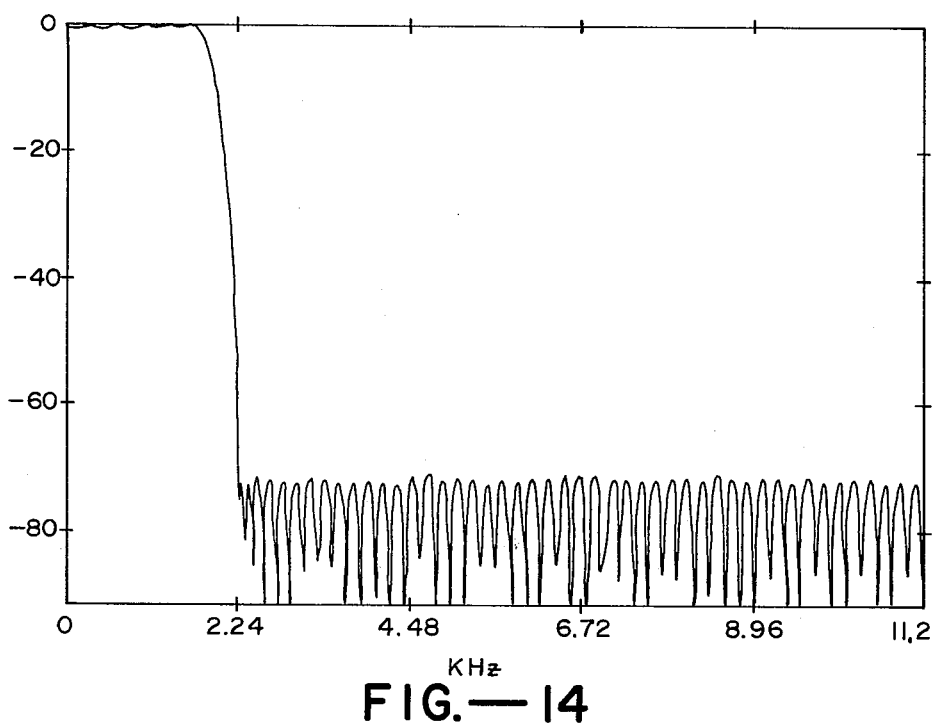
FIG.—14

TRANSMULTIPLEXER

Cross reference is made to Application Ser. No. 814,303 now U.S. Pat. No. 4,131,766 filed July 11, 1977 by Madihally J. Narasimha and entitled DIGITAL FILTER BANK.

The present invention relates to a transmultiplexer and method for use in a telephone system for translating data between frequency division and time division multiplexed formats.

In presently existing telephone systems, two types of multiplexing techniques are used for the transmission of informational data of several channels over a common link. The older and predominant system is frequency division multiplexing (FDM) and the recent and faster growing technique is time division multiplexing (TDM). The increasing use of pulse code modulation (PCM) terminals and digital switching exchanges, copuled with the slow pace of replacing existing analog carrier equipment has created a need for the FDM and TDM systems to coexist and communicate with each other. As a result, a method of translating between these two systems is required in a mixed analog-digital telephone network. Terminology to refer to such translation is often called transmultiplexing.

In one prior art approach, a digital signal processing system emulates an FDM channel bank and performs TDM-FDM translation, using the so-called "Weaver" technique on a per channel basis, but does not make use of the computational savings obtainable by treating the frequency translation of a group of data or voice channels taken jointly.

Another approach utilizes fast Fourier transform (FFT) techniques to reduce the computational burden in modulating and demodulating a group of channels.

The TDM-FDM translation problem can be solved by a cascade combination of a discrete Fourier transform (DFT) processor and a weighting network or polyphase network. The polyphase network can be viewed as a set of N filters (where N denotes the number of channels involved) obtained from phase shifting and undersampling the low pass prototype filter. If the filter is a finite impulse response (FIR) filter, it is appropriate to call the polyphase network a weighting or window network, thereby rendering the terminology familiar to those using a DFT for spectral analysis.

The motivation behind decomposing the frequency translation problem into a DFT and a weighting network is that an efficient FFT algorithm can be employed to reduce the computation rate in the DFT. With the introduction of high speed algorithms for computing the DFT, the efficiency of the translation scheme can be further improved. Such a method is described in the above cross-referenced application entitled Digital Filter Bank, assigned to the same assignee of the present application, which performs translations between FDM and TDM formats utilizing a fast Fourier transform together with a weighting network. While a digital signal processing system such as described above is satisfactory, it is desirable if the computational requirements required for performing translations between FDM and TDM formats could be reduced, thereby improving the cost/performance ratio.

In view of the above background, it is an object of the present invention to provide an improved transmultiplexer for use in a telephone system for translating data between frequency division and time division multiplexed formats.

The present invention relates to a transmultiplexer and method for use in a telephone system for translating data between frequency division and time division multiplexed formats.

The transmultiplexer includes discrete cosine transform processor means connected to receive a multi-bit linearly coded time division multiplexed signal representing a plurality of information channels such as might occur on a multitime slot digital data bus such as T1 line. The processor means transforms the multi-bit signal into a frequency division multiplexed signal.

A weighting network is included for weighting the transformed signal with predetermined real coefficients thereby forming a frequency division multiplexed signal having a plurality of information channels corresponding to the time division signal, thereby providing means for translating a multi-channel time division multiplexed signal into a corresponding multi-channel frequency division multiplexed signal.

According to the present invention, a demodulator can be provided for performing a translation between a multi-channel frequency division multiplexed input signal to a corresponding multi-channel time division multiplexed signal and includes weighting network means for weighting the frequency division multiplexed signal with predetermined real coefficients thereby forming a weighted sequence.

Inverse discrete cosine transform processor means are provided for transforming the weighted sequence into a time division multiplexed signal corresponding to the frequency division multiplexed signal.

In accordance with the above summary, the present invention achieves the objective of providing an improved transmultiplexer and method for use in a telephone system for translating information between time division and frequency division multiplexed formats.

Other objects and features of the present invention will become apparent from the following description when taken in conjunction with the drawings.

FIG. 1 depicts a transmultiplexer for interfacing TDM and FDM systems using digital and analog channel banks.

FIG. 2 depicts a block diagram of a digital 24-channel transmultiplexer.

FIG. 3A depicts a block diagram of a 12-channel TDM-FDM transmultiplexer, which forms a portion of FIG. 2.

FIG. 3B depicts a frequency scheme of the transmultiplexer of FIG. 2.

FIG. 4 depicts a block diagram of a bandpass filter bank for single sideband modulation and demodulation.

FIG. 5A depicts a prototype filter.

FIG. 5B depicts a frequency scheme of the bandpass filter bank of FIG. 4.

FIG. 7 depicts an FDM demodulator according to the present invention.

FIG. 8 depicts another demodulation diagram according to the present invention.

FIG. 9 depicts a modulator filter bank according to the present invention.

FIG. 10 depicts another modulation diagram according to the present invention.

FIG. 11 depicts a flow graph for a 14-point inverse discrete cosine transform used in the demodulator of FIG. 7.

FIG. 12 depicts a flow graph of a discrete cosine transform used in an FDM modulator as depicted in FIG. 8.

FIG. 13 depicts a block diagram for implementing the discrete cosine transform flow diagrams of FIGS. 11 and 12.

FIG. 14 depicts a view of the frequency response according to the present invention.

Figure 6:
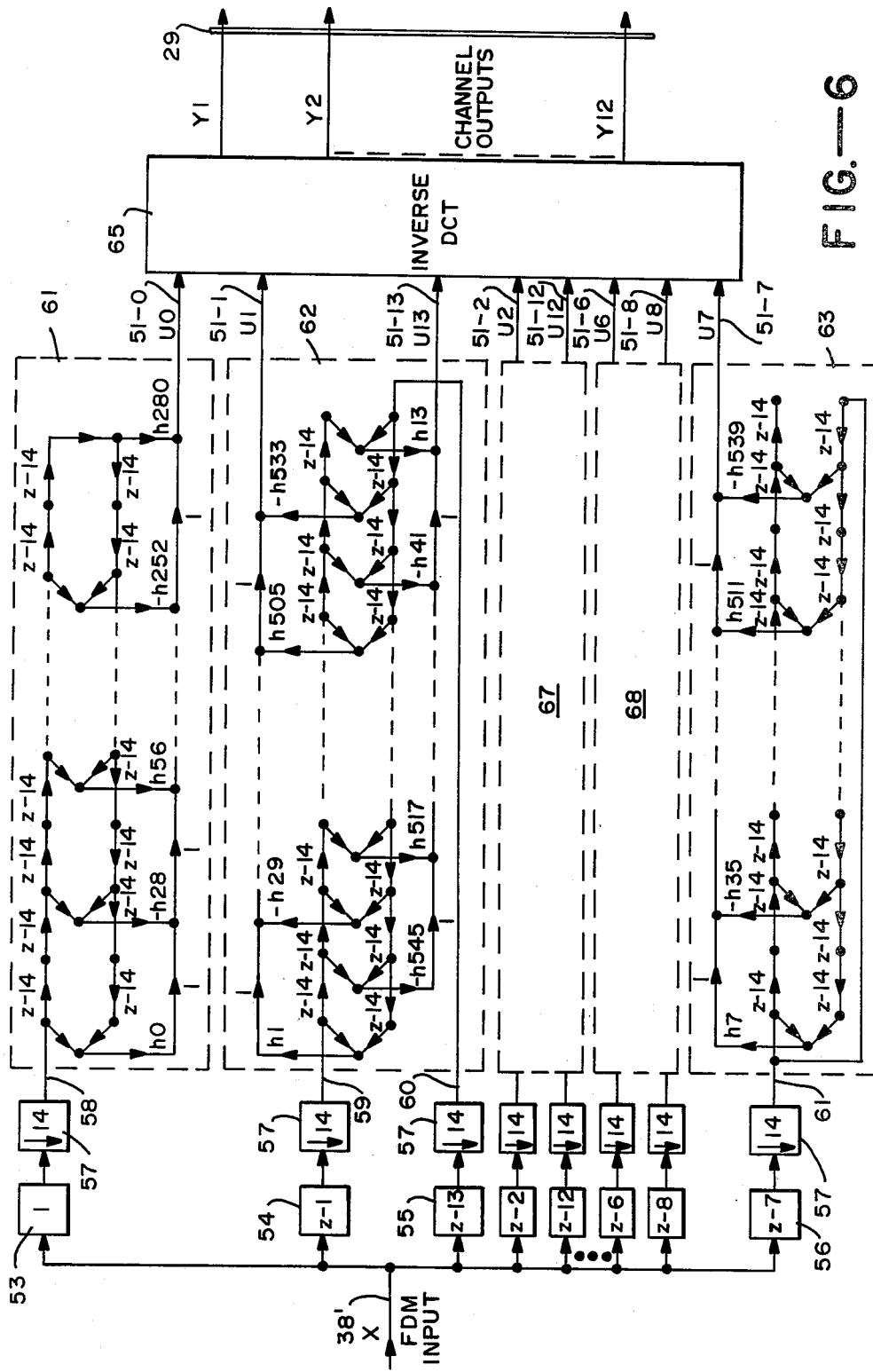
FIG. 6 depicts a demodulator filter bank showing a flow graph representation for a weighting network.

Referring to FIG. 1, there is depicted therein a digital switch 10 which connects pulse code modulated (PCM) digital data onto bus 11, which could be a multitime slot digital data bus such as a T1 line, which transmits in serial fashion 24 voice channels multiplexed in a time division multiplexed (TDM) format at a rate of 1,544 k bit/s.

The digital data on bus 11 is connected to transmultiplexer 12, which comprises a PCM channel bank 13, single frequency (SF) signaling adapter 16, and FDM channel bank 19. Transmultiplexer 12 operates to translate digital data on bus 11 into a frequency division multiplexed format onto buses 25, 26 for connection to FDM base group translation equipment 24.

In FIG. 1, the digital channel banks (D banks) 13 convert the data on bus 11 to voice frequency data on bus 17 and E and M signaling information on bus 18. These are combined in the signaling adapter 16 to obtain voice frequency signals containing single-frequency (SF) signaling information, which is then input on buses 20, 21 to FDM channel bank 19 providing the basic group signals in the 60–108 KHz band on buses 25, 26, which in turn are translated to a super group level by translation equipment 24.

In FIG. 2, an all digital solution to translating a T1 signal such as on buss 11 in FIG. 1 into two FDM group bands on buses 25, 26 are depicted. The T1 interface and signaling converter 28 replaces the channel banks 13 and signaling adapter 16 of FIG. 1. The T1 interface 28 is similar to a D3 channel bank with the exception of instead of providing a final analog-digital conversion process, the voice information in $\mu$255 coding is changed into a 14-bit linear code. Mapping of the T1 signaling bit into the well known 2600 Hz inband SF signaling is accomplished in the converter 28 using digital filters, which provide necessary conversions. A digital processor can be used to accomplish this task.

The 14-bit linear code from interface and signaling converter 28 is connected to buses 29, 30 which in turn are connected to TDM-FDM translators 32, 33 respectively, which serve to translate the TDM digital information on buses 29, 30 into the 60–108 KHz signals on buses 25, 26 respectively.

In FIG. 3A, there is depicted therein a 12-channel TDM-FDM translator according to the present invention, in which translator 32 is connected to bus 29 to receive the 12-channel TDM signal having 14-bit linear coding and operates to translate the TDM signal on bus 29 into an FDM signal on bus 25. Translator 32 includes a digital filter bank 35 which modulates the 12 linearly coded channels on bus 29 where each channel is sampled at 8 KHz and contains in-band signaling information. Filter bank 35 modulates the 12 linearly coded signals into a 4–52 KHz frequency band with the FDM sequence sampled at 112 KHz, as seen in FIG. 3B. Filter bank 35 includes a 14-point discrete cosine transform processor (DCT) 36 and a 561-tap weighting network 37 for performing the translation between TDM and FDM signals. As depicted in FIG. 3B, the mirror image band lying in the 60–108 KHz region can be picked up by a digital to analog converter and bandpass filter, such as circuit 39 in the TDM-FDM direction, while bandpass filtering followed by digitizing at a 112 KHz sample rate would translate the group signal on bus 25 into the 4–52 KHz band on bus 38 in the opposite direction.

Digital filter bank 35 comprising the 14-point discrete cosine transform processor 36 and weighting network 37 form the basis of the present invention and accordingly further details will be limited to discussing the filter bank or translator 35.

In order to simplify D/A conversion and bandpass filtering, two guard channels are included in the FDM system. The composite signal sampled at a 112 KHz rate can be obtained by increasing the sample rate on each of the voice channels to the higher rate, which can be done by inserting zeroes, bandpass filtering with a set of filters uniformly spaced in frequency and summing the output of these filters.

This procedure is depicted in FIG. 4, where the center frequency of the $n^{th}$ bandpass filter is $f_n = (n + \frac{1}{2})$ 4 KHz. In FIG. 4, the spectrum of odd number channels needs to be inverted before filtering in order to obtain upright sidebands in all positions. The negate alternate circuits 41 provide this spectral inversion by multiplying alternate channel inputs with the sequence 1, $-1$, 1, $-1$, . . . Circuits 42 increase the sample rate on each of the channels by inserting zero samples and then filtering by bandpass filters 43 followed by summing the outputs of these filters in the adder 44 yields the required FDM sequence.

Demodulation of a wideband frequency multiplexed signal such as on bus 45 can be accomplished by the demodulator portion as depicted in FIG. 4, in which filters 47 pass the appropriate frequency bands, decreased sample rate circuits 48 provide down conversion by deleting samples, and negate alternate circuits 49 provide necessary conversion for forming the demodulated voice channels on channels CH1–CH12.

In order to illustrate the operation of the filter bank or translator 35 of FIG. 2, the demodulation process will be described in detail. However, the modulation process can be obtained easily according to the present invention and it is intended that the scope of this invention is directed toward both modulation and demodulation apparatus and method.

In FIG. 5A, the impulse response h(m) of a low pass filter is depicted having a 4 KHz bandpass. If x(.) is a wideband FDM signal sampled at 112 KHz, the demodulation of x into baseband channels $y_1, y_2, \ldots y_{12}$ can be accomplished by passing it through a filter bank having a frequency response as depicted in FIG. 5B. If $h_n(m)$ denotes the impulse response of $n^{th}$ filter in this bank, it can be expressed in terms of the response h(m) by the relation $$h_n(m) = h(m) \cos [\pi(2n+1)m/28], \; n=1,2,\ldots,12, \quad (1)$$

Considering the demodulation process with input x(r), the output $y_n(r)$ of the $n^{th}$ channel, assuming an FIR prototype filter of length M+1, is given by $$y_n(r) = \sum_{m=0}^{M} x(r-m) h(m) \cos[\pi(2n+1)m/28], \quad (2)$$

-continued $$n = 1, 2, \ldots, 12,$$

In order to make use of symmetry condition, it has been found to be advantageous to choose the filter length to be a multiple of 28, plus 1. In one embodiment, a 561 tap filter is sufficient. Also, making use of the relation $h(m)=h(560-m)$, the output of the $n^{th}$ channel can be written as $$y_n(r) = x(r - 280) h(280) + \sum_{m=0}^{279} [x(r - m) + x(r - 560 + m)] h(m) \cos[\pi(2n + 1)m/28], \quad (3)$$

The filter length is divided into blocks of 28 each. That is, let $$m = 28p + q, \quad \begin{array}{l} p = 0, 1, \ldots, 9 \\ q = 0, 1, \ldots, 27 \end{array} \quad (4)$$

Substituting equation (4) in (3) and subsequent simplification results in $$y_n(r) = \sum_{q=0}^{13} u(r,q)\cos[\pi(2n + 1)q/28], \quad (5)$$

$$n = 1, 2, \ldots, 12,$$

The sequence $u(r,q)$, $q=0,1,\ldots 13$, in equation (5) is given by
$$u(r,0) = x(r-280)h(280) + v(r,0)$$
$$u(r,q) = v(r,q) - v(r,28-q), \quad q=1,2,\ldots,13$$
where $$v(r,q) = \sum_{p=0}^{9} (-1)^p [x(r - 28p - q) + x(r - 560 + 28p + q)] h(28p + q) \quad (6)$$

From equation (5) the channel outputs $y_1, y_2, \ldots y_{12}$, (including guard bands $y_0$ and $y_{13}$), can be obtained by computing the inverse discrete cosine transform (DCT) of the weighted sequence $u(r,q)$. The channel outputs are diminished in bandwidth by a factor of 14 and hence can be undersampled by this ratio, since, in the preferred embodiment, these outputs are computed only once every 14 input samples.

To incorporate this undersampling effect and to rewrite the defining equation for $u(r,q)$, $q=1,2,\ldots 13$, in a more compact way [by using the symmetry property $h(m)=h(560-m)$], the demodulated channel outputs are given by $$y_n(14r) = \sum_{q=0}^{13} u(14r,q)\cos[\pi(2n + 1)q/28], \quad (7)$$

$$n = 1, 2, \ldots, 12,$$

where $$u(14r,0) = x(14r - 280)h(280) + \sum_{p=0}^{9} (-1)^p h(28p)[x(14r - 28p) + x(14r - 560 + 28p)]$$

$$u(14r,q) = \sum_{p=0}^{19} (-1)^p h(28p + q)[x(14r - 28p - q) + x(14r - 560 + 28p + q)], q = 1, 2, \ldots, 13 \quad (8)$$

FIG. 6 depicts a flowgraph representation of a demodulator described by equations (7) and (8) and the detailed operations required only for the weighting network are shown. The method of calculating an inverse DCT will be described in conjunction with FIG. 9.

The translation of an FDM sequence $x(.)$ is performed according to equations (7) and (8), in which the sequence $u(.,q)$, $q=0,1,\ldots 13$, on buses 51-0 to 51-13, respectively, is calculated according to equation (8) and then an inverse DCT is performed upon the weighted sequence $u_0-u_{13}$ to obtain the channel outputs $y_1-y_{12}$ on buses 29 (which correspond to equation (7)).

In FIG. 6, the FDM sequence on bus 38' sampled at 112 KHz is passed through appropriate delay networks 53-56 and then the data is undersampled by retaining only one of every 14 samples (by undersampling circuits 57), thereby forming decimated sequences on buses 58-61, which enter a series of shift register means 61-63, each having 40 taps. In FIG. 6, a branch denoted by $z^{-14}$ corresponds to a unit sample delay at the 8 KHz rate. For example, the data on bus 58 sequentially enters shift register means 61 where it is appropriately delayed by delay means $z^{-14}$, and after summing the appropriate tap outputs, the signals in register means 61 are weighted by filter coefficients $h_0, -h_{28}, h_{56}, \ldots -h_{252}, h_{280}$, and accumulated to yield the $u_0$ sequence on bus 51-0. Weighted sequence $u_1-u_{13}$ are evaluated in a similar manner in shift register means 62-63, 67, 68, thereby forming a weighted sequence on bus 51 which is input to inverse DCT processor 65, which performs an inverse discrete cosine transform according to equation (7) on the weighted sequence thereby forming the channel outputs on bus 29.

Filter coefficients are real and can be evaluated by known programming techniques and are set forth in their entirety in Chart I.

Coefficients of the 559-tap prototype filter for the weighting network (16-bit quantized); the filter is lengthened to 561-taps by appending $H(0)=H(560)=0$.

CHART I

FILTER COEFFICIENTS

| H( 0) | = | H(560) | .000000 |
|---|---|---|---|
| H( 1) | = | H(559) | .002404 |
| H( 2) | = | H(558) | .000813 |
| H( 3) | = | H(557) | .000938 |
| H( 4) | = | H(556) | .001071 |
| H( 5) | = | H(555) | .001207 |
| H( 6) | = | H(554) | .001348 |

| | | | |
|---|---|---|---|
| H( 7) | = | H(553) | .001493 |
| H( 8) | = | H(552) | .001636 |
| H( 9) | = | H(551) | .001782 |
| H( 10) | = | H(550) | .001922 |
| H( 11) | = | H(549) | .002056 |
| H( 12) | = | H(548) | .002181 |
| H( 13) | = | H(547) | .002299 |
| H( 14) | = | H(546) | .002404 |
| H( 15) | = | H(545) | .002495 |
| H( 16) | = | H(544) | .002565 |
| H( 17) | = | H(543) | .002619 |
| H( 18) | = | H(542) | .002652 |
| H( 19) | = | H(541) | .002655 |
| H( 20) | = | H(540) | .002635 |
| H( 21) | = | H(539) | .002583 |
| H( 22) | = | H(538) | .002501 |
| H( 23) | = | H(537) | .002385 |
| H( 24) | = | H(536) | .002234 |
| H( 25) | = | H(535) | .002040 |
| H( 26) | = | H(534) | .001821 |
| H( 27) | = | H(533) | .001557 |
| H( 28) | = | H(532) | .001250 |
| H( 29) | = | H(531) | .000914 |
| H( 30) | = | H(530) | .000535 |
| H( 31) | = | H(529) | .000118 |
| H( 32) | = | H(528) | -.000338 |
| H( 33) | = | H(527) | -.000825 |
| H( 34) | = | H(526) | -.001344 |
| H( 35) | = | H(525) | -.001890 |
| H( 36) | = | H(524) | -.002473 |
| H( 37) | = | H(523) | -.003075 |
| H( 38) | = | H(522) | -.003695 |
| H( 39) | = | H(521) | -.004330 |
| H( 40) | = | H(520) | -.004970 |
| H( 41) | = | H(519) | -.005620 |
| H( 42) | = | H(518) | -.006277 |
| H( 43) | = | H(517) | -.006921 |
| H( 44) | = | H(516) | -.007552 |
| H( 45) | = | H(515) | -.008165 |
| H( 46) | = | H(514) | -.008754 |
| H( 47) | = | H(513) | -.009312 |
| H( 48) | = | H(512) | -.009833 |
| H( 49) | = | H(511) | -.010311 |
| H( 50) | = | H(510) | -.010738 |
| H( 51) | = | H(509) | -.011111 |
| H( 52) | = | H(508) | -.011424 |
| H( 53) | = | H(507) | -.011669 |
| H( 54) | = | H(506) | -.011844 |
| H( 55) | = | H(505) | -.011945 |
| H( 56) | = | H(504) | -.011966 |
| H( 57) | = | H(503) | -.011906 |
| H( 58) | = | H(502) | -.011762 |
| H( 59) | = | H(501) | -.011533 |
| H( 60) | = | H(500) | -.011216 |
| H( 61) | = | H(499) | -.010817 |
| H( 62) | = | H(498) | -.010331 |

| | | | |
|---|---|---|---|
| H( 63) | = | H(497) | −.009762 |
| H( 64) | = | H(496) | −.009113 |
| H( 65) | = | H(495) | −.008387 |
| H( 66) | = | H(494) | −.007589 |
| H( 67) | = | H(493) | −.006725 |
| H( 68) | = | H(492) | −.005801 |
| H( 69) | = | H(491) | −.004824 |
| H( 70) | = | H(490) | −.003803 |
| H( 71) | = | H(489) | −.002745 |
| H( 72) | = | H(488) | −.001661 |
| H( 73) | = | H(487) | −.000561 |
| H( 74) | = | H(486) | .000547 |
| H( 75) | = | H(485) | .001649 |
| H( 76) | = | H(484) | .002730 |
| H( 77) | = | H(483) | .003790 |
| H( 78) | = | H(482) | .004816 |
| H( 79) | = | H(481) | .005789 |
| H( 80) | = | H(480) | .006701 |
| H( 81) | = | H(479) | .007541 |
| H( 82) | = | H(478) | .008300 |
| H( 83) | = | H(477) | .008967 |
| H( 84) | = | H(476) | .009534 |
| H( 85) | = | H(475) | .009993 |
| H( 86) | = | H(474) | .010336 |
| H( 87) | = | H(473) | .010557 |
| H( 88) | = | H(472) | .010651 |
| H( 89) | = | H(471) | .010614 |
| H( 90) | = | H(470) | .010444 |
| H( 91) | = | H(469) | .010140 |
| H( 92) | = | H(468) | .009703 |
| H( 93) | = | H(467) | .009132 |
| H( 94) | = | H(466) | .008433 |
| H( 95) | = | H(465) | .007610 |
| H( 96) | = | H(464) | .006670 |
| H( 97) | = | H(463) | .005620 |
| H( 98) | = | H(462) | .004469 |
| H( 99) | = | H(461) | .003228 |
| H(100) | = | H(460) | .001910 |
| H(101) | = | H(459) | .000526 |
| H(102) | = | H(458) | −.000908 |
| H(103) | = | H(457) | −.002379 |
| H(104) | = | H(456) | −.003860 |
| H(105) | = | H(455) | −.005361 |
| H(106) | = | H(454) | −.006840 |
| H(107) | = | H(453) | −.008286 |
| H(108) | = | H(452) | −.009687 |
| H(109) | = | H(451) | −.011020 |
| H(110) | = | H(450) | −.012270 |
| H(111) | = | H(449) | −.013420 |
| H(112) | = | H(448) | −.014455 |
| H(113) | = | H(447) | −.015358 |
| H(114) | = | H(446) | −.016117 |
| H(115) | = | H(445) | −.016718 |
| H(116) | = | H(444) | −.017150 |
| H(117) | = | H(443) | −.017404 |
| H(118) | = | H(442) | −.017472 |

| | | | |
|---|---|---|---|
| H(119) | = | H(441) | −.017347 |
| H(120) | = | H(440) | −.017026 |
| H(121) | = | H(439) | −.016507 |
| H(122) | = | H(438) | −.015791 |
| H(123) | = | H(437) | −.014879 |
| H(124) | = | H(436) | −.013777 |
| H(125) | = | H(435) | −.012492 |
| H(126) | = | H(434) | −.011034 |
| H(127) | = | H(433) | −.009414 |
| H(128) | = | H(432) | −.007646 |
| H(129) | = | H(431) | −.005747 |
| H(130) | = | H(430) | −.003733 |
| H(131) | = | H(429) | −.001626 |
| H(132) | = | H(428) | .000554 |
| H(133) | = | H(427) | .002784 |
| H(134) | = | H(426) | .005040 |
| H(135) | = | H(425) | .007297 |
| H(136) | = | H(424) | .009530 |
| H(137) | = | H(423) | .011712 |
| H(138) | = | H(422) | .013816 |
| H(139) | = | H(421) | .015821 |
| H(140) | = | H(420) | .017697 |
| H(141) | = | H(419) | .019419 |
| H(142) | = | H(418) | .020965 |
| H(143) | = | H(417) | .022311 |
| H(144) | = | H(416) | .023439 |
| H(145) | = | H(415) | .024328 |
| H(146) | = | H(414) | .024963 |
| H(147) | = | H(413) | .025326 |
| H(148) | = | H(412) | .025413 |
| H(149) | = | H(411) | .025209 |
| H(150) | = | H(410) | .024710 |
| H(151) | = | H(409) | .023915 |
| H(152) | = | H(408) | .022825 |
| H(153) | = | H(407) | .021443 |
| H(154) | = | H(406) | .019776 |
| H(155) | = | H(405) | .017840 |
| H(156) | = | H(404) | .015645 |
| H(157) | = | H(403) | .013210 |
| H(158) | = | H(402) | .010556 |
| H(159) | = | H(401) | .007711 |
| H(160) | = | H(400) | .004697 |
| H(161) | = | H(399) | .001546 |
| H(162) | = | H(398) | −.001710 |
| H(163) | = | H(397) | −.005035 |
| H(164) | = | H(396) | −.008390 |
| H(165) | = | H(395) | −.011754 |
| H(166) | = | H(394) | −.015071 |
| H(167) | = | H(393) | −.018306 |
| H(168) | = | H(392) | −.021425 |
| H(169) | = | H(391) | −.024385 |
| H(170) | = | H(390) | −.027147 |
| H(171) | = | H(389) | −.029677 |
| H(172) | = | H(388) | −.031937 |
| H(173) | = | H(387) | −.033895 |
| H(174) | = | H(386) | −.035520 |

| | | | |
|---|---|---|---|
| H(175) | = | H(385) | −.036784 |
| H(176) | = | H(384) | −.037662 |
| H(177) | = | H(383) | −.038133 |
| H(178) | = | H(382) | −.038180 |
| H(179) | = | H(381) | −.037790 |
| H(180) | = | H(380) | −.036955 |
| H(181) | = | H(379) | −.035672 |
| H(182) | = | H(378) | −.033941 |
| H(183) | = | H(377) | −.031771 |
| H(184) | = | H(376) | −.029172 |
| H(185) | = | H(375) | −.026160 |
| H(186) | = | H(374) | −.022760 |
| H(187) | = | H(373) | −.018997 |
| H(188) | = | H(372) | −.014904 |
| H(189) | = | H(371) | −.010516 |
| H(190) | = | H(370) | −.005875 |
| H(191) | = | H(369) | −.001026 |
| H(192) | = | H(368) | .003982 |
| H(193) | = | H(367) | .009096 |
| H(194) | = | H(366) | .014266 |
| H(195) | = | H(365) | .019430 |
| H(196) | = | H(364) | .024530 |
| H(197) | = | H(363) | .029506 |
| H(198) | = | H(362) | .034302 |
| H(199) | = | H(361) | .038854 |
| H(200) | = | H(360) | .043103 |
| H(201) | = | H(359) | .046991 |
| H(202) | = | H(358) | .050463 |
| H(203) | = | H(357) | .053466 |
| H(204) | = | H(356) | .055951 |
| H(205) | = | H(355) | .057872 |
| H(206) | = | H(354) | .059189 |
| H(207) | = | H(353) | .059860 |
| H(208) | = | H(352) | .059874 |
| H(209) | = | H(351) | .059191 |
| H(210) | = | H(350) | .057798 |
| H(211) | = | H(349) | .055689 |
| H(212) | = | H(348) | .052860 |
| H(213) | = | H(347) | .049319 |
| H(214) | = | H(346) | .045079 |
| H(215) | = | H(345) | .040162 |
| H(216) | = | H(344) | .034596 |
| H(217) | = | H(343) | .028427 |
| H(218) | = | H(342) | .021692 |
| H(219) | = | H(341) | .014450 |
| H(220) | = | H(340) | .006760 |
| H(221) | = | H(339) | −.001309 |
| H(222) | = | H(338) | −.009682 |
| H(223) | = | H(337) | −.018279 |
| H(224) | = | H(336) | −.027013 |
| H(225) | = | H(335) | −.035793 |
| H(226) | = | H(334) | −.044525 |
| H(227) | = | H(333) | −.053109 |
| H(228) | = | H(332) | −.061446 |
| H(229) | = | H(331) | −.069432 |
| H(230) | = | H(330) | −.076965 |

| | | |
|---|---|---|
| H(231) = | H(329) | −.063943 |
| H(232) = | H(328) | −.090262 |
| H(233) = | H(327) | −.095820 |
| H(234) = | H(326) | −.100537 |
| H(235) = | H(325) | −.104303 |
| H(236) = | H(324) | −.107039 |
| H(237) = | H(323) | −.108662 |
| H(238) = | H(322) | −.109100 |
| H(239) = | H(321) | −.108284 |
| H(240) = | H(320) | −.106159 |
| H(241) = | H(319) | −.102675 |
| H(242) = | H(318) | −.097795 |
| H(243) = | H(317) | −.091495 |
| H(244) = | H(316) | −.083733 |
| H(245) = | H(315) | −.074531 |
| H(246) = | H(314) | −.063884 |
| H(247) = | H(313) | −.051800 |
| H(248) = | H(312) | −.038333 |
| H(249) = | H(311) | −.023500 |
| H(250) = | H(310) | −.007359 |
| H(251) = | H(309) | .010024 |
| H(252) = | H(308) | .028575 |
| H(253) = | H(307) | .048203 |
| H(254) = | H(306) | .068827 |
| H(255) = | H(305) | .090328 |
| H(256) = | H(304) | .112594 |
| H(257) = | H(303) | .135503 |
| H(258) = | H(302) | .158920 |
| H(259) = | H(301) | .182727 |
| H(260) = | H(300) | .206764 |
| H(261) = | H(299) | .230891 |
| H(262) = | H(298) | .254961 |
| H(263) = | H(297) | .278822 |
| H(264) = | H(296) | .302323 |
| H(265) = | H(295) | .325313 |
| H(266) = | H(294) | .347643 |
| H(267) = | H(293) | .369167 |
| H(268) = | H(292) | .389743 |
| H(269) = | H(291) | .409233 |
| H(270) = | H(290) | .427507 |
| H(271) = | H(289) | .444441 |
| H(272) = | H(288) | .459920 |
| H(273) = | H(287) | .473839 |
| H(274) = | H(286) | .486102 |
| H(275) = | H(285) | .496627 |
| H(276) = | H(284) | .505338 |
| H(277) = | H(283) | .512177 |
| H(278) = | H(282) | .517096 |
| H(279) = | H(281) | .520061 |
| H(280) | | .521055 |

Transposing of the flowgraph of FIG. 6 will yield a filter bank for a modulator, in which case a forward DCT is performed on the channel inputs. The transformed outputs are then passed through the transpose of the weighting network of FIG. 6 and thereafter the sampling rate of the weighted sequence is increased to 112 KHz by inserting zeroes. The oversampled sequences are appropriately delayed and added together to obtain the FDM sequence. The combination of inserting zeroes, delaying and summing the sequences corresponds to interleaving the points coming out of the weighting network of FIG. 6.

The flowgraph of FIG. 6 depicts a set of 14 filters implemented with shift register means and operating on appropriately delayed input points to evaluate the weighted sequence u(.,q), q=0,1, ... 13, on bus 51. It is preferable in practice to share an arithmetic unit among the filters in order to reduce the hardware complexity.

A hardware implementation for evaluating the weighted sequence u(.,q) in a serial manner is depicted in FIG. 7. The description of FIG. 7 implements a weighting network which resembles the direct form utilization of a linear phase FIR filter in which unit sample delays of the FIR filter are replaced by 14-length shift registers performing a certain pattern of permutation to be described.

A slight simplification in the hardware can be achieved by assuming that the last filter coefficient h(560) is zero. Such a filter can be obtained by implementing a 559-tap filter and then setting the end tap-gains h(0) and h(560) to zero. This last operation does not change the frequency response of the original filter and preserves the linear phase characteristics. In that case, the describing equation for u(14r,0) can be rewritten as $$u(14r,0) = \sum_{p=0}^{19} (-1)^p h(28p) x(14r - 28p) \quad (9)$$

In FIG. 7, the FDM sequence on bus 38' is reversed in blocks of 14 by passing it through circuit 70, which could be shift register means appropriately controlled by logic circuitry (not shown) to reverse the serial data. If the input to circuit 70 (labeled R14) is the sequence $x_0, x_1, \ldots x_{13}/x_{14}, x_{15}, \ldots x_{27}/, \ldots$, the output of circuit 70 with a 14 sample delay is the sequence $x_{13}, x_{12}, \ldots x_0/x_{27}, x_{26}, \ldots x_{14}/\ldots$. The time reversed sequence is then shifted through permutation shift registers 71-77 (which are denoted by blocks labeled P14). A pattern of permutation is performed on the input sequence in blocks of 14, in addition to shifting it by 14 samples in units 71-77.

For the same input sequence $x_0, x_1, \ldots x_{13}/x_{14}, x_{15}, \ldots x_{27}/, \ldots$ the output of permutation shift register 71 will be $x_0, x_{13}, \ldots x_1/x_{14}, x_{27}, \ldots x_{15}/\ldots$, with a delay of 14 samples. Thwe permutation involved here is one of retaining the first sample and reversing the other 13 in a block of 14. Two of the permutations correspond to a delay of 28 samples.

The outputs from each of the permutation means 71-77 are summed in adders 80-83, the outputs of which are multiplied in mulitpliers 85-88, respectively, by filter coefficients $h_0$-$h_{560}$, which can be stored in appropriate recirculating shift registers 90-93, respectively. The data is accumulated in adder 94 and the weighted sequence obtained is in the order of u(.,0), u(.,1), ... u(.,13), which can be stored in shift register means 95.

Processor 65 then performs an inverse DCT on the weighted sequence in register means 95 to produce the channel outputs $y_1$-$y_{12}$ on bus 29, thereby forming the time division multiplexed signal having channel outputs corresponding to the frequency division multiplexed input on bus 38'.

In calculating the output of u(.,0), there is no summing before multiplying the filter coefficients and only one of the inputs to the two input adders will be active and the other is set to zero.

The reversing and permutation operations can be accomplished by proper addressing of random access memories (RAM). A set of read only memories (ROM) driven by a counter will serve the function of recirculating shift registers for storing the predetermined filter coefficients.

FIG. 8 depicts a block diagram of a weighting network utilizing a serial implementation and which is a simplified representation of FIG. 7. Input data on bus 38' is input to a 560-word memory 120, which when appropriately addressed via bus 118 will perform the reversing and permutating functions, and the output is connected to adder 121 (which corresponds to adders 80-83 of FIG. 7) where the data is added together with delayed data from latch 122. The output of adder 121 is input to a multiplier accumulator circuit which performs the necessary weighting of the data by multiplying the input data from adder 121 together with data from a coefficient PROM 124, which stores the precalculated coefficients of Chart I. The output of multiplier 123 is input to adder 125, which adds the weighted data from multiplier 123 together with previous data from register 126 and the output is sent out on bus 96, upon which an inverse discrete cosine transform can be performed.

FIG. 9 depicts a weighting network for a corresponding modulator, which is a transpose of the hardware depicted in FIG. 7. In FIG. 9, the channel inputs $y_1$-$y_{12}$ on bus 29' are connected to DCT processor 101 which transforms the channel inputs thereby forming the weighted FDM sequence $u_0$-$u_{13}$ in shift register means 95.

The recirculating registers 90-93 and the P14 permutation blocks 71-77 remain the same as for FIG. 7. Reversing of the FDM outputs is not necessary. The sequence is sequentially multiplied in multipliers 85-88 by the stored pedetermined filter coefficients in means 90-93, respectively. The outputs of multipliers 85-88 are connected to permutation means 71-77 and added in adders 102-108, the output of which is the frequency division multiplexed signal on bus 38.

For the demodulator weighting network of FIG. 7, the initial reversing of the FDM sequency by reversing means is not required if the weighted sequence is evaluated in the order u(.,13), u(.,12), ... u(.,0), in which case the permutation performed by the permutation means is different and the filter coefficients in the recirculating registers 90-93 are stored in a different order. If it is desired to retain the same permutation means 71-77 and recirculating filter coefficients in the modulator, the reversing operation is performed at the FDM outputs on bus 38.

Referring now to FIG. 10, a diagram of a transmitter weighting network is illustrated in which input data from register 95 is input to multiplier 130 where the data is multiplied by the weighting coefficients from PROM 131. The weighted output from multiplier 130 is input to adder 132 and input to 560-word memory 133, which is addressed via bus 134 in a similar manner as in FIG. 8 to provide the necessary shifting and permutation functions and the output of memory 133 is input to adder 132, which adds the weighted samples with the appropriate addressed samples from memory 134. The output of adder 132 on bus 38 is a frequency division multiplexed output corresponding to that of FIG. 9.

Referring now to FIG. 11, there is depicted therein a flow chart illustrating the calculation of an inverse DCT to be performed by the IDCT circuit 65 of FIG. 7. In order to obtain channel outputs $y_n(.)$, an inverse DCT is performed on the weighted sequence u(.,q)

which was calculated in accordance with equation (8) and depicted in FIG. 7. Denoting $u(.,q)$ by $u_q$ the relation between $y_n$ and $u_q$ is given by $$y_n = \sum_{q=0}^{13} u_q \cos[\pi(2n+1)q/28], \quad n = 1, 2, \ldots, 12, \quad (10)$$

In FIG. 11, the computation of the inverse DCT requires 16 multiplies and 76 additions. An algorithm for computing the forward DCT, which is required in the modulation direction, can be derived on similar lines and is illustrated in FIG. 12.

Defining the symmetry relation $$y_{14-n-1} = \sum_{q=0}^{13} (-1)^q u_q \cos[\pi(2n+1)q/28] \quad (11)$$

and defining two new sequences $$a_n = \tfrac{1}{2}(y_n + y_{14-n-1}) = \sum_{q=0}^{6} u_{2q} \cos[\pi(2n+1)2q/28] \quad (12)$$

$$n = 1, 2, \ldots, 6$$

$$b_n = \tfrac{1}{2}(y_n - y_{14-n-1}) = \quad (13)$$

$$\sum_{q=0}^{6} u_{2q+1} \cos[\pi(2n+1)(2q+1)/28]$$

$$n = 1, 2, \ldots, 6$$

$y_n$, $n=1,2,\ldots 12$, can be obtained by adding and subtracting the $a_n$ and $b_n$ values in equations (12) and (13) above.

A procedure for evaluating the $a_n$ sequence is described below.

$$c_k = \cos(\pi k/28), \; k = 1,2,3,\ldots \quad (14)$$

Then $$a_3 = u_0 - u_4 + u_8 - u_{12} \quad (15)$$

$$\begin{bmatrix}(a_1+a_5)/2\\(a_2+a_4)/2\\a_6'\end{bmatrix} = \begin{bmatrix}u_0\\u_0\\u_0\end{bmatrix} + \begin{bmatrix}c_{12} & -c_4 & -c_8\\-c_8 & -c_{12} & c_4\\c_4 & c_8 & c_{12}\end{bmatrix}\begin{bmatrix}u_4\\u_8\\u_{12}\end{bmatrix} \quad (16)$$

$$\begin{bmatrix}(a_1-a_5)/2\\(a_2-a_4)/2\\a_6''\end{bmatrix} = \begin{bmatrix}c_6 & -c_{10} & -c_2\\c_{10} & -c_2 & c_6\\-c_2 & -c_6 & -c_{10}\end{bmatrix}\begin{bmatrix}u_2\\u_6\\u_{10}\end{bmatrix} \quad (17)$$

where $a_6'$ and $a_6''$ are such that $$a_6 = a_6' + a_6'' \quad (18)$$

It is clear that $a_1, \ldots, a_6$ can be obtained easily if the two matrix multiplication problems indicated above in (16) and (17) are solved.

By a suitable re-ordering of columns and rows and changing signs, this can be reduced to a standard matrix multiplication problem shown below:

$$\begin{bmatrix}z_0\\z_1\\z_2\end{bmatrix} = \begin{bmatrix}x_0 & x_1 & x_2\\x_1 & x_2 & x_0\\x_2 & x_0 & x_1\end{bmatrix}\begin{bmatrix}y_0\\y_1\\y_2\end{bmatrix} \quad (19)$$

The evaluation of $z_0$, $z_1$ and $z_2$ in (19) can be accomplished by the following algorithm which requires 4 multiplys and 11 adds. Let $$m_0 = [(x_0 + x_1 + x_2)/3](y_0 + y_1 + y_2) \quad (20)$$

$$m_1 = [(x_2 + x_1 - 2x_0)/3](y_0 - y_2)$$

$$m_2 = [(x_0 + x_2 - 2x_1)/3](y_2 - y_1)$$

$$m_3 = [(x_0 + x_1 - 2x_2)/3](y_1 - y_0)$$

Then $$z_0 = m_0 - m_1 + m_2 \quad (21)$$

$$z_1 = m_0 + m_1 - m_3$$

$$z_2 = m_0 - m_2 + m_3$$

Note that the factors $(x_0+x_1+x_2)/3$ etc., can be precomputed.

The evaluation of $b_n$, defined in (13), is slightly more difficult. Again letting $c_k = \cos(\pi k/28)$, and using the relations $$c_1 = c_7(c_6 + c_8) \quad (22)$$

$$c_3 = c_7(c_4 + c_{10})$$

$$c_5 = c_7(c_2 + c_{12})$$

$$c_9 = c_7(c_2 - c_{12})$$

$$c_{11} = c_7(c_4 - c_{10})$$

$$c_{13} = c_7(c_6 - c_8)$$

the equations for obtaining $b_1, \ldots, b_6$ can be written as follows:

$$\text{Let } u_k' = c_7 u_k = u_k/\sqrt{2}, \; k = 1,3,5,7,9,11,13, \quad (23)$$

Then $$b_3 = u_7' + (u_1' - u_{13}') - (u_3' + u_{11}') - (u_5' - u_9') \quad (24)$$

$$\begin{bmatrix}(b_1+b_5)/2\\(b_2-b_4)/2\\b_6'\end{bmatrix} = \begin{bmatrix}c_4 & -c_{12} & c_8\\c_{12} & c_8 & -c_4\\-c_8 & -c_4 & -c_{12}\end{bmatrix}\begin{bmatrix}u_1'-u_{13}'\\u_3'+u_{11}'\\u_5'-u_9'\end{bmatrix} - \begin{bmatrix}u_7'\\u_7'\\u_7'\end{bmatrix} \quad (25)$$

$$\begin{bmatrix}(b_1-b_5)/2\\(b_2+b_4)/2\\b_6''\end{bmatrix} = \begin{bmatrix}c_{10} & c_2 & -c_6\\c_2 & -c_6 & -c_{10}\\c_6 & c_{10} & c_2\end{bmatrix}\begin{bmatrix}u_1'+u_{13}'\\u_3'-u_{11}'\\u_5'+u_9'\end{bmatrix} \quad (26)$$

where $b_6' + b_6'' = b_6$ (27)

It is not necessary to perform multiplication by $1/\sqrt{2}$ to obtain $u_k'$ from $u_k$ in the DCT processor since those multiplications can be evaluated by adjusting the (odd) coefficients of the weighting network. The above matrix multiplications can be reduced to a standard form as before and the four multiplies and eleven adds algorithms can be used to evaluate them.

In FIG. 11, a complete flowgraph for the evaluation of the channel output $y_n$ from $u_0, u_2, \ldots u_{12}, u_1', u_3', \ldots u_{13}'$ is depicted.

In FIG. 11, the inverse DCT can be performed according to the flowgraph depicted therein in which the coefficients $k_0$-$k_7$ are set forth as follows in Chart II.

| CHART II |
|---|
| $k_0 = 0.1666667$ |
| $k_1 = 0.0558543$ |
| $k_2 = 0.7343022$ |
| $k_3 = k_1 + k_2$ |
| $k_4 = 0.4409586$ |
| $k_5 = 0.5339694$ |
| $k_6 = 0.3408729$ |
| $k_7 = k_5 + k_6$ |

In FIG. 11, the $y_1$-$y_{12}$ channel outputs on bus 29 can be evaluated by following through the flowgraph.

Referring now to FIG. 12, there is depicted therein a DCT algorithm for the modulator for the DCT processor 101 of FIG. 9. The DCT algorithm transforms the time division multiplexed data on bus 29' into the sequence u(.,q) for connection to the register means 95 of FIG. 9.

The evaluation of the algorithm is analogous to that of FIG. 11 and utilizes the same coefficients $k_0$-$k_7$ depicted in Chart II.

For the hardware configuration depicted in FIG. 7, the amount of computation in the weighting network at a 112 KHz rate is 20 multiplies and 39 additions. The following DCT computation requires about 16 multiplies and 76 additions. A DCT has to be evaluated every 125 us and the total computational burden for a 12-channel demodulator amounts to about 2.3 million multiplies/second and 4.8 million additions/second. The same amount of computation is performed in the modulator.

Referring now to FIG. 13, a block diagram of a discrete cosine transform is illustrated which can perform both forward and inverse transforms according to the signal flow diagrams of FIGS. 11 and 12.

Constants $k_0$ and $k_7$ are stored in memory 140 and input data on bus 142 are input into a 256-word RAM 141. The output of RAM 141 is input to adder 143 and latch 144, and the output of adder 143 is input to multiplier 145, and to output bus 142. Multiplier 145 performs the necessary multiplication of constants $k_0$-$k_7$ together with the added data from adder 143 and the output is connected to output bus 142.

Referring now to FIG. 14, there is depicted therein an expanded view of the frequency response of the present invention between 0 and 11.2 KHz, which is 1/10th of the sampling frequency. In FIG. 14, the frequency response between 0 and 2 KHz corresponds to the requirements depicted in FIG. 5, and frequencies above 2 KHz are attenuated below −70 db. Similar attenuation is provided for frequencies between 11.2 KHz and 56 KHz.

There has been presented herein a description of a transmultiplexer between 24-channel TDM systems and 2 FDM base groups in which a TDM-FDM translator can be utilized by cascading a weighting network and a discrete cosine transform processor. The decomposition arises from the fact that individual filters in the filter bank required for the translation are frequency shifted versions of a low pass prototype. The concept is applicable to both modulation and demodulation processes since those two are related by a transposition operation. The use of symmetry conditions in a weighting network and employing high speed convolution algorithms to evaluate the DCT greatly reduces the computational burden in the system.

What is claimed is:

1. A transmultiplexer for converting a first multi-channel time division multiplexed signal into a second corresponding multi-channel frequency division multiplexed signal, said transmultiplexer comprising: discrete cosine transform processor means connected to receive a linearly coded time division multiplexed signal representing said first signal for transforming said signal into a transformed signal, and weighting network means for weighting said transformed signal with predetermined real coefficients thereby forming a frequency division multiplexed signal corresponding to said time signal.

2. A transmultiplexer as in claim 1 wherein said transformed signal includes a plurality of data samples corresponding to said coded signal and wherein said weighting network means includes multiplier means for sequentially multiplying said data samples with predetermined ones of said real coefficients, permutation means for permutating the weighted samples, and adder means for adding the permutated samples thereby forming said frequency signals.

3. A transmultiplexer comprising: weighting network means connected to receive a multi-channel frequency division multiplexed signal for weighting the frequency signal with predetermined real coefficients thereby forming a weighted signal, and inverse discrete cosine transform processor means for transforming said weighted signal into a multi-channel time division multiplexed signal corresponding to said frequency signal.

4. A transmultiplexer comprising: interface means connected to receive information data on a multi-time slot serial digital data bus for converting said data into a multi-bit linearly coded time division multiplexed signal, a translator connected to receive said linearly coded signal, said translator including discrete cosine transform means responsive to said linearly coded signal for transforming said linearly coded signal into a transformed signal having a plurality of data samples corresponding to said multi-bit signal, and weighting network means for weighting said transformed signal with predetermined real coefficients thereby forming a frequency division multiplexed signal corresponding to said time division multiplexed signal.

5. A transmultiplexer comprising: a translator connected to receive a frequency division multiplexed signal having a plurality of information channels, said translator including weighting network means for weighting said information channels with predetermined real coefficients thereby forming a weighted sequence, and inverse discrete cosine transform processor means responsive to said weighting sequence for transforming said weighted sequence into a multi-bit linearly coded time division multiplexed signal, interface means responsive to said linearly coded signal for converting said linearly coded signal into a serial bit time division multiplexed signal.

6. In a transmultiplexer for use in a telephone system, the method comprising the steps of computing a discrete cosine transform upon a linearly coded time division multiplexed signal thereby forming a transformed signal, and weighting the transformed signal with predetermined real coefficients thereby forming a frequency division multiplexed signal corresponding to the time division multiplexed signal.

7. In a transmultiplexer for use in a telephone system, the method comprising the steps of: weighting a multi-channel frequency division multiplexed signal with predetermined real coefficients thereby forming a weighted sequence, and computing an inverse discrete cosine transform upon the weighted sequence thereby forming a multi-channel time division multiplexed signal corresponding to said frequency division multiplexed signal.

* * * * *